(12) United States Patent
Lee et al.

(10) Patent No.: US 10,705,657 B2
(45) Date of Patent: Jul. 7, 2020

(54) TOUCH PANEL HAVING SENSE PATTERNS OF MESH TYPE METAL GRIDS, DISPLAY APPARATUS, AND METHOD OF MANUFACTURING THE TOUCH PANEL

(71) Applicants: Samsung Display Co., Ltd., Yongin (KR); UNIST Academy-Industry Research Corporation, Ulsan (KR)

(72) Inventors: Choon-Hyop Lee, Yongin (KR); Heung-Seok Go, Yongin (KR); Jang-Ung Park, Ulsan (KR); Byeong-Wan An, Ulsan (KR); In-Nam Lee, Yongin (KR); Young-Kuil Joo, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 141 days.

(21) Appl. No.: 14/248,126

(22) Filed: Apr. 8, 2014

(65) Prior Publication Data

US 2015/0153873 A1 Jun. 4, 2015

(30) Foreign Application Priority Data

Dec. 2, 2013 (KR) .................. 10-2013-0148786

(51) Int. Cl.
*G06F 3/044* (2006.01)

(52) U.S. Cl.
CPC .... *G06F 3/044* (2013.01); *G06F 2203/04102* (2013.01); *G06F 2203/04103* (2013.01); *Y10T 29/49155* (2015.01)

(58) Field of Classification Search
CPC ........... G06F 3/044; G06F 2203/04102; G06F 2203/04103; G06F 2203/04111;
(Continued)

(56) References Cited

U.S. PATENT DOCUMENTS 8,530,266 B1 * 9/2013 Chen ................ H01L 27/14623
257/291
8,557,508 B2 * 10/2013 Li ............................ G06F 3/044
216/17

(Continued)

FOREIGN PATENT DOCUMENTS

CN 101 276 091 10/2008
CN 202084018 U * 12/2011 ............. G06F 3/041
(Continued)

OTHER PUBLICATIONS

Park, et al., "High-resolution electrohydrodynamic jet printing," Nature Materials, Aug. 5, 2007, pp. 782-789, vol. 6, Nature Publishing Group.

(Continued)

*Primary Examiner* — Chun-Nan Lin
(74) *Attorney, Agent, or Firm* — H.C. Park & Associates, PLC

(57) ABSTRACT

A touch panel, a display apparatus, and a method of manufacturing the touch panel. The touch panel includes a substrate, sense patterns disposed on the substrate and including a mesh type metal grid, and a transparent conductive layer patterned to correspond to each of the sense patterns and disposed to cover the metal grid.

19 Claims, 12 Drawing Sheets

(58) Field of Classification Search
CPC .... G06F 1/1643; G06F 1/1652; G06F 3/0412; H01L 27/3225
See application file for complete search history.

(56) References Cited

U.S. PATENT DOCUMENTS

| | | |
|---|---|---|
| 2003/0127965 A1 | 7/2003 | Uemura et al. |
| 2005/0243447 A1 | 11/2005 | Lee et al. |
| 2009/0002580 A1 | 1/2009 | Matsushima et al. |
| 2009/0219257 A1 | 9/2009 | Frey et al. |
| 2011/0109583 A1 | 5/2011 | Lee |
| 2011/0291058 A1 | 12/2011 | Kunishi et al. |
| 2012/0127112 A1 | 5/2012 | Lu et al. |
| 2012/0287363 A1* | 11/2012 | Chen ................. G02F 1/134336 349/43 |
| 2013/0027118 A1 | 1/2013 | Ho et al. |
| 2013/0048339 A1 | 2/2013 | Tour et al. |
| 2013/0293096 A1 | 11/2013 | Kang et al. |
| 2014/0078414 A1* | 3/2014 | Lee ......................... G06F 3/041 349/12 |
| 2014/0111709 A1* | 4/2014 | Kim ................... G02F 1/13338 349/12 |
| 2014/0209359 A1* | 7/2014 | Lebens ................... H05K 1/02 174/253 |
| 2014/0252317 A1* | 9/2014 | Gupta ................. H01L 51/5203 257/40 |

FOREIGN PATENT DOCUMENTS

| | | |
|---|---|---|
| CN | 102 388 422 | 3/2012 |
| EP | 2521012 | 11/2012 |
| KR | 10-2003-0048336 | 6/2003 |
| KR | 10-2005-0105383 | 11/2005 |
| KR | 10-2012-0029119 | 3/2012 |
| KR | 10-2013-0027089 | 3/2013 |

OTHER PUBLICATIONS

Jeong, et al., "Air-stable, surface-oxide free Cu nanoparticles for highly conductive Cu ink and their application to printed graphene transistors," Journal of Materials Chemistry C, Feb. 13, 2013, pp. 2704-2710, vol. 1, The Royal Society of Chemistry.

Youngil Lee, et al., "Large-Scale Synthesis of Copper Nanoparticles by Chemically Controlled Reduction for Applications of Inkjet-Printed Electronics," Nanotechnology, Sep. 4, 2008, pp. 1-7, vol. 19, Issue 41, IOP Publishing, available at http://iopscience.iop.org/0957-4484/19/41/415604.

Extended European Search Report dated Mar. 23, 2015, in European Patent Application No. 14172618.2.

European Office Action dated Jun. 2, 2016 in European Patent Application No. 14 172 618.2.

Office Action, dated Jun. 5, 2018, in Chinese Patent Application No. 201410418659.9, filed on Aug. 22, 2014.

* cited by examiner

TOUCH PANEL HAVING SENSE PATTERNS OF MESH TYPE METAL GRIDS, DISPLAY APPARATUS, AND METHOD OF MANUFACTURING THE TOUCH PANEL

CROSS-REFERENCE TO RELATED APPLICATION

This application claims priority from and the benefit of Korean Patent Application No. 10-2013-0148786, filed on Dec. 2, 2013, which is hereby incorporated by reference for all purposes as if fully set forth herein.

BACKGROUND

Field

Exemplary embodiments of the present invention relate to a touch panel, a display apparatus, and a method of manufacturing the touch panel.

Discussion of the Background

A touch screen panel ("TSP") arranged on a front surface of a display apparatus, such as an organic light-emitting display or a liquid crystal display, is an input device that converts a contact of a user's hand or a pen into an electrical signal to allow a corresponding user's command to be input. As a method of realizing the touch screen panel, various schemes, such as a touch method using a resistance film, a touch method using light sensing, or a touch method using capacitance overlay, are known.

Recently, as flexible display apparatuses have been actively researched, the desirability of applying a TSP to the flexible display apparatus has increased.

The above information disclosed in this Background section is only for enhancement of understanding of the background of the invention and, therefore, it may contain information that does not constitute prior art.

SUMMARY

Exemplary embodiments of the present invention provide a touch panel, a display apparatus, and a method of manufacturing the touch panel.

Additional features of the invention will be set forth in part in the description which follows and, in part, will be apparent from the description, or may be learned by practice of the invention.

An exemplary embodiment of the present invention discloses a touch panel including: a substrate; sense patterns disposed on the substrate and including mesh type metal grids; and a transparent conductive layer patterned to correspond to each of the sense patterns and disposed to cover the metal grids.

An exemplary embodiment of the present invention also discloses a display apparatus including: a display panel and a touch panel disposed on a surface of the display panel from which light is emitted. The touch panel includes: a substrate; sense patterns disposed on the substrate and including mesh type metal grids; and a transparent conductive layer patterned to correspond to each of the sense patterns and disposed to cover the metal grids.

An exemplary embodiment of the present invention also discloses a method of manufacturing a touch panel, including: forming mesh type metal grids on a substrate; forming a transparent conductive layer to cover the metal grids; and patterning the metal grids and the transparent conductive layer to form sense patterns such that the patterned transparent conductive layer corresponds to each of the sense patterns.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
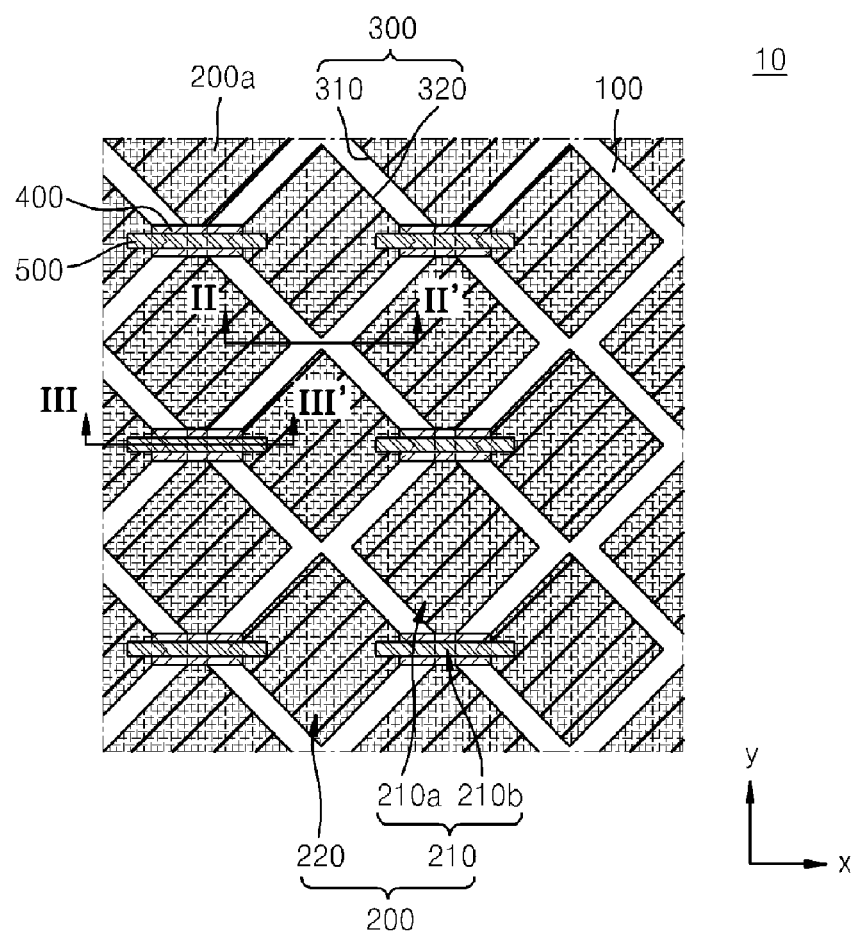
FIG. 1 is a plan view schematically illustrating a touch panel according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of elements may be exaggerated for clarity. Like reference numerals in the drawings denote like elements. As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on," "directly connected to", or "directly coupled to" another layer, region, or component, it can be directly or indirectly formed on, connected to, or coupled to the other layer, region, or component, or intervening layers, regions, or components may be present. In contrast, when a layer, region, or component is referred to as being "directly formed on", "directly connected to", or "directly coupled to" another element or layer, there are no intervening elements or layers present. As used herein, the term "and/or" includes any and all combinations of one or more of the associated listed items. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Referring to FIG. 1, the touch panel 10 according to an exemplary embodiment includes a substrate 100, sense patterns 200 disposed on the substrate 100 and including a mesh type metal grid 200a, and a transparent conductive layer 300 patterned to correspond to each of the sense patterns 200 and disposed to cover the metal grid 200a.

The substrate 100 is a flexible transparent substrate and may include at least one of poly methyl methacrylate (PMMA), polydimethylsiloxane (PDMS), polyethylene terephthalate (PET), a silicon elastomer, polyurethane, and polycarbonate (PC).

The sense patterns 200 are disposed on the substrate 100, and the sense patterns 200 may include first sense patterns 210 extended along a first direction (y axis direction) and substantially disposed in parallel with each other, and second sense patterns 220 interposed between the first sense patterns 210. Although shown as quadrangular-shaped, the sense patterns 200 may have various shapes, such as an oval, triangle, hexagon, polygon, and the like.

The first and second sense patterns 210 and 220 may include mesh type metal grids 200a. The metal grids 200a may include a metallic material such as silver (Ag), aluminum Al, or copper Cu.

The first sense patterns 210 may include first sense pattern units 210a and connection patterns 210b connecting the first sense pattern units 210a. The first sense pattern units 210a may be electrically connected along the first direction (y axis direction) by the connection patterns 210b.

Second sense patterns 220 may be disposed between the first sense patterns 210. The second sense patterns 220 may be electrically connected along a second direction (x axis direction) that intersects with the first direction (y axis direction) by bridge patterns 500 disposed on a different layer from that of the second sense patterns 220. This will be described in detail later. In another exemplary embodiment, the first sense patterns 210 may be arranged in the second direction (x axis direction), and the second sense patterns 220 may be arranged in the first direction (y axis direction). In this case, the bridge patterns 500 would then be disposed in the first direction (y axis direction) to connected adjacent second sense patterns 220.

The touch panel 10 may include an active region including the sense patterns 200, and an inactive region including wirings (not shown) disposed outside the active region, where the wirings are electrically connected to each of the sense patterns 200 and a pad unit (not shown). An external touch driving circuit (not shown) may be electrically connected to the pad unit.

Accordingly, when a user's hand or a pen is in contact with the touch panel 10, signals from the sense patterns 200 corresponding to the contact position may be delivered to the touch driving circuit through the wirings, and the touch driving circuit may determine a touch position from x axis position information obtained from the first sense patterns 210 and y axis position information obtained from the second sense patterns 220.

The transparent conductive layer 300 is disposed on the sense patterns 200 including the metal grids 200a. The transparent conductive layer 300 is patterned to correspond to each of the sense patterns 200, and may include at least one of graphene, metal nanowires, carbon nanotubes, Poly (3,4-ethylenedioxythiophene) (PEDOT), and metal grids.

The transparent conductive layer 300 may include a material which is more difficult to oxidize than the metal grids 200a. The metal grids 200a will be prevented from oxidizing by disposing the transparent conductive layer 300 to cover the metal grids 200a. Thus, the transparent conductive layer 300 may function as an oxidation barrier layer.

Figure 2:
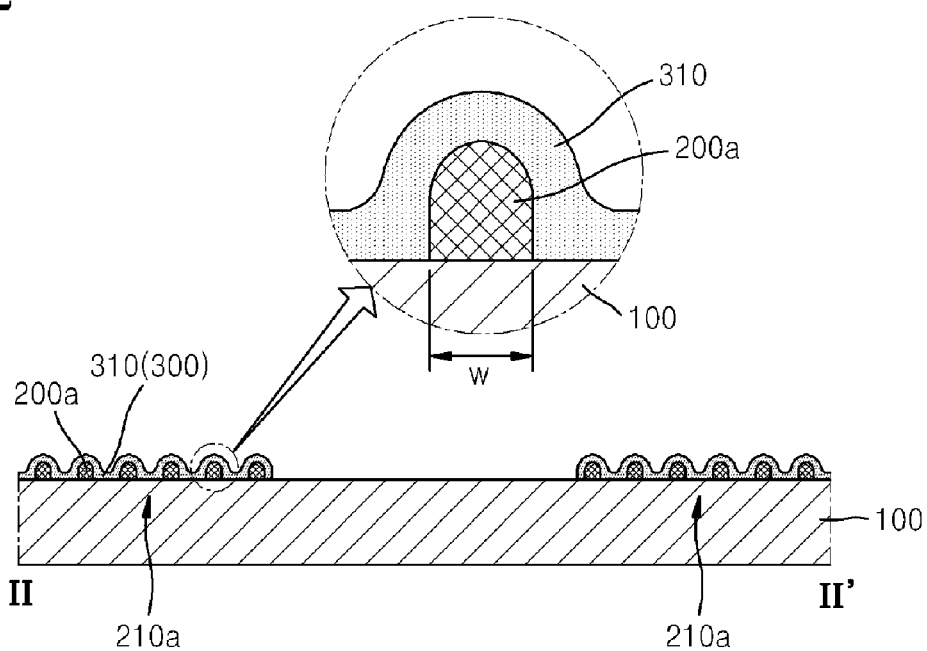
FIG. 2 is a cross-sectional view taken along a line II-II' in the touch panel of FIG. 1.

Referring to FIG. 2, the metal grids 200a may include metal lines having curved surfaces and a linewidth w of 10 μm or smaller. Such metal lines may be implemented by an electrohydrodynamic jet printing method. By using these configurations, damage to the transparent conductive layer 300 disposed on the metal grids 200a may be prevented, and transmittance of the metal grids 200a may be increased, as will be described later.

The transparent conductive layer 300 is disposed on the substrate 100 to cover the metal grids 200a. That is, the transparent conductive layer 300 may cover the metal lines along the curved surfaces thereof, which are included in the mesh type metal grids 200a, and be disposed to fill vacant spaces between the metal lines.

Although the metal grids 200a have a lower resistance value than indium tin oxide (ITO) in a plane state, the resistance value may be increased when the touch panel 10 is bent or stretched. This increase of the resistance value may cause degradation in the characteristics of the touch panel 10. Accordingly, a touch panel including only the metal grids 200a as sense electrodes has limitations when used as a flexible touch panel 10 having high flexibility.

However, the touch panel 10 according to exemplary embodiments of the present invention may include the transparent conductive layer 300 to cover the metal grids 200a, further lower resistance of the metal grids 200a as a result of the transparent conductive layer 300, and significantly reduce an increase in resistance that occurs when the metal grids 200a are bent or stretched.

The transparent conductive layer 300 may include first transparent conductive layers 310 disposed on the first sense patterns 210 and second transparent conductive layers 320 disposed on the second sense patterns 220.

Figure 3:
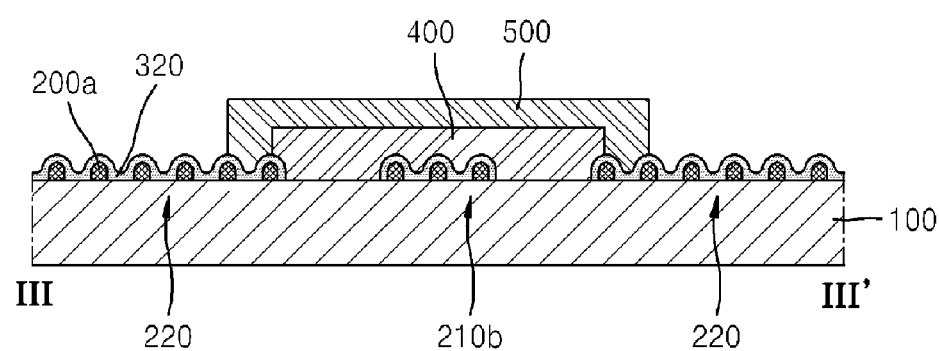
FIG. 3 is a cross-sectional view taken along a line III-III' in the touch panel of FIG. 1.

FIG. 3 illustrates a configuration in which the second sense patterns 220 are electrically connected by the bridge patterns 500. The second sense patterns 220 are divided as an island type on the substrate 100, and the second transparent conductive layers 320 patterned to correspond to each of the second sense patterns 220 are disposed on the second sense patterns 220.

The second sense patterns 220 separated from each other are electrically connected by the bridge patterns 500 along the second direction (x axis direction) that intersects with the first direction (y axis direction), and the bridge patterns 500 may be disposed on top surfaces of the connection patterns 210b of the first sense patterns 210.

In order to insulate the connection patterns 210b from the bridge patterns 500, an insulation layer 400 may be interposed between the connection patterns 210b and the bridge patterns 500. The insulation layer 400 may be extended to cover the end portions of the second sense patterns 220.

The bridge patterns 500 may include various conductive materials, for example, a metal such as silver(Ag), molybdenum (Mo), aluminum(Al), gold(Au), or copper(Cu), or a transparent oxidation layer such as ITO, indium zinc oxide (IZO), or zinc oxide (ZnO).

The second transparent conductive layers 320 may be electrically connected to each other by the bridge patterns 500 along the second direction (x axis direction), and accordingly, the second sense patterns 220 disposed on a bottom surface of the second transparent conductive layers 320 may be electrically connected to each other along the second direction (x axis direction).

Figure 7:
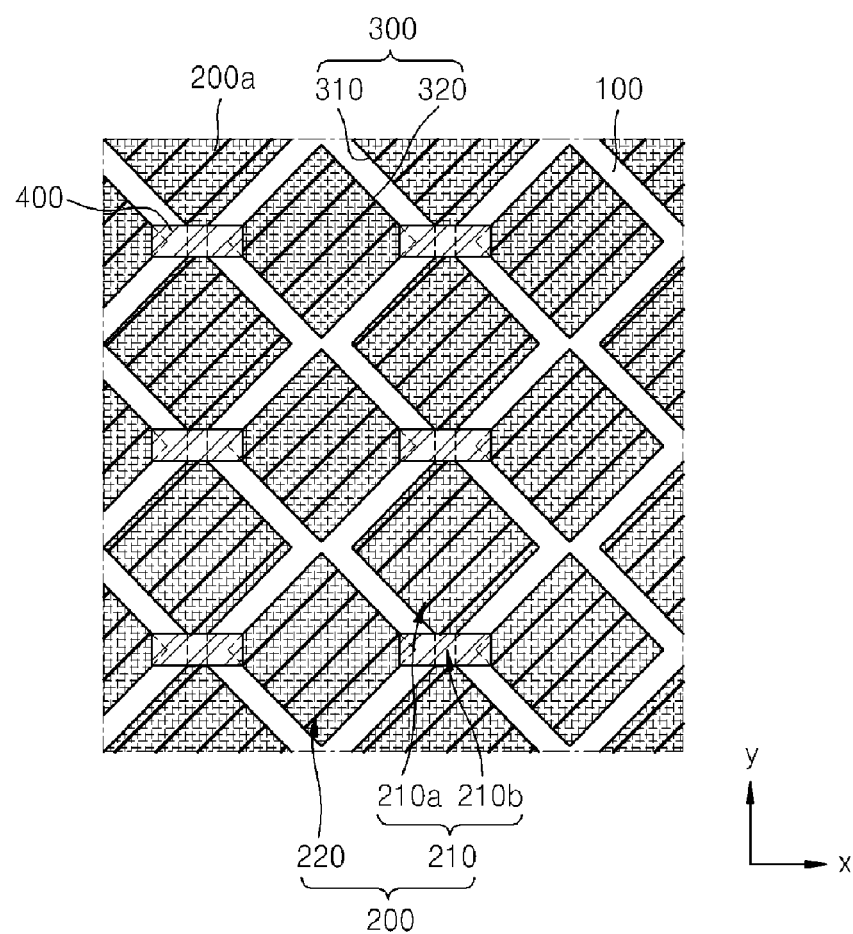
Figure 8:
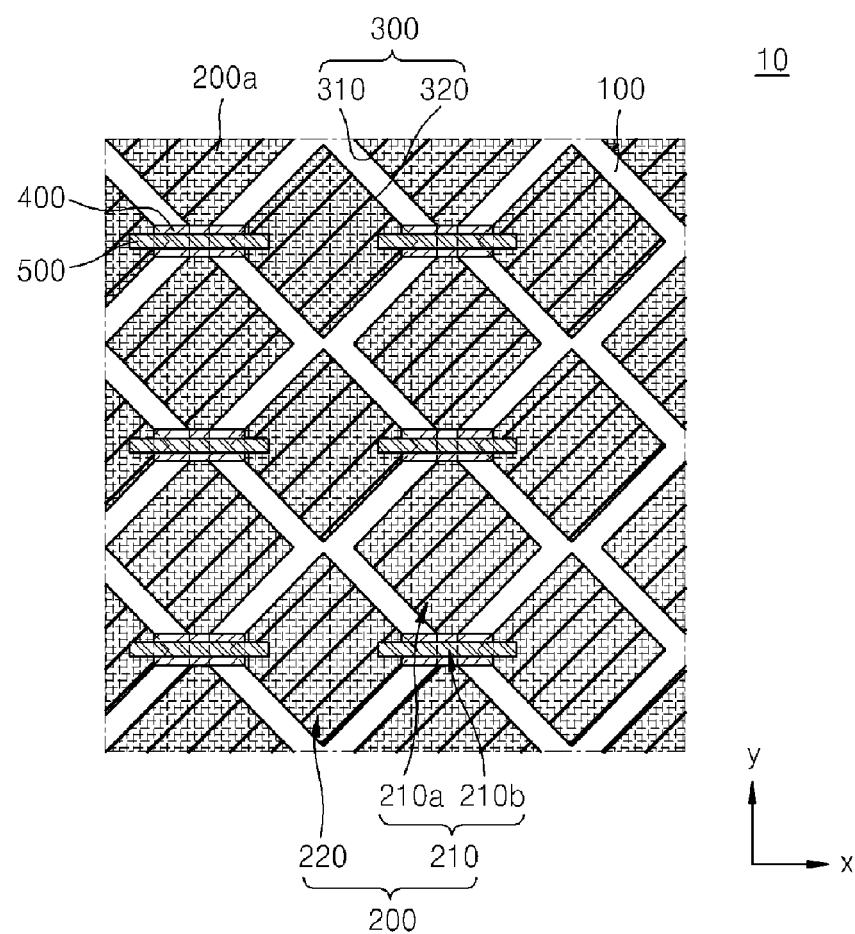
Figure 9A:
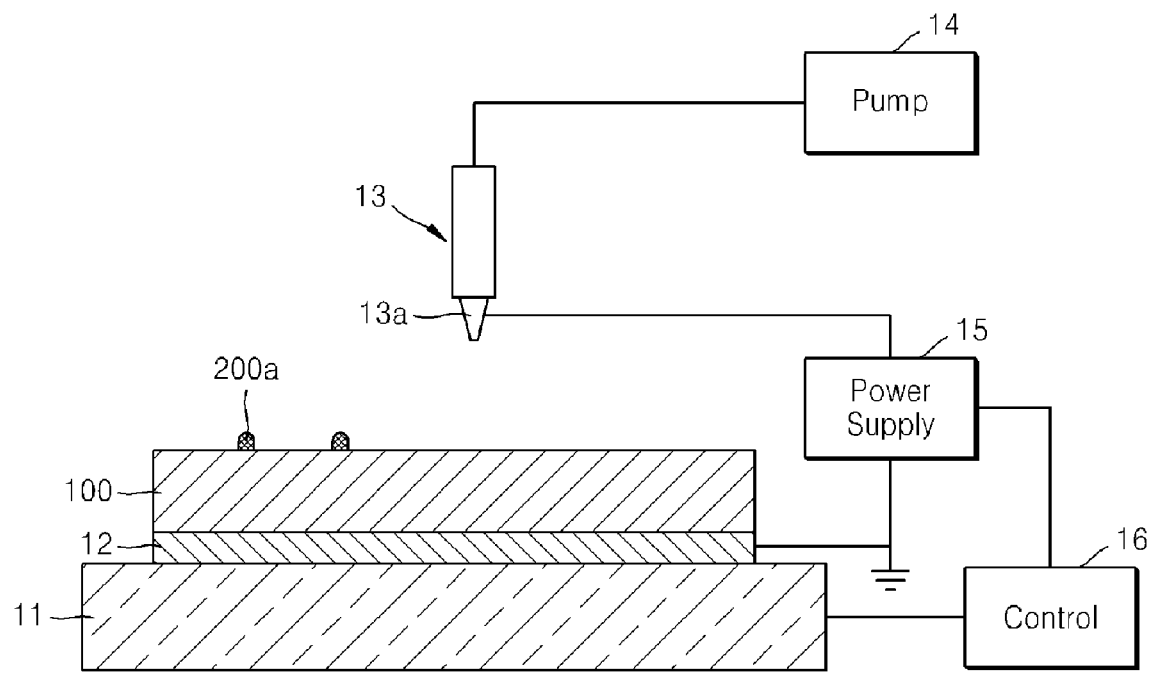
FIGS. 9A and 9B are conceptual diagrams illustrating an apparatus forming the metal grids included in the touch panel of FIG. 1.
Figure 9B:
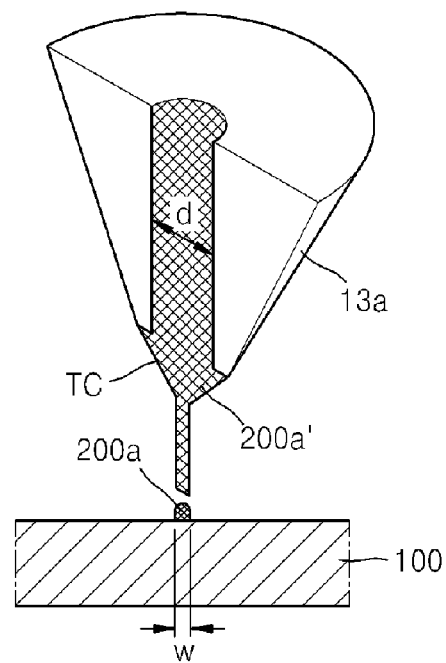

FIGS. 4 to 8 are plan views schematically illustrating a method of manufacturing the touch panel of FIG. 1, and FIGS. 9A and 9B are conceptual diagrams illustrating an apparatus for forming the metal grids included in the touch panel of FIG. 1.

Figure 4:
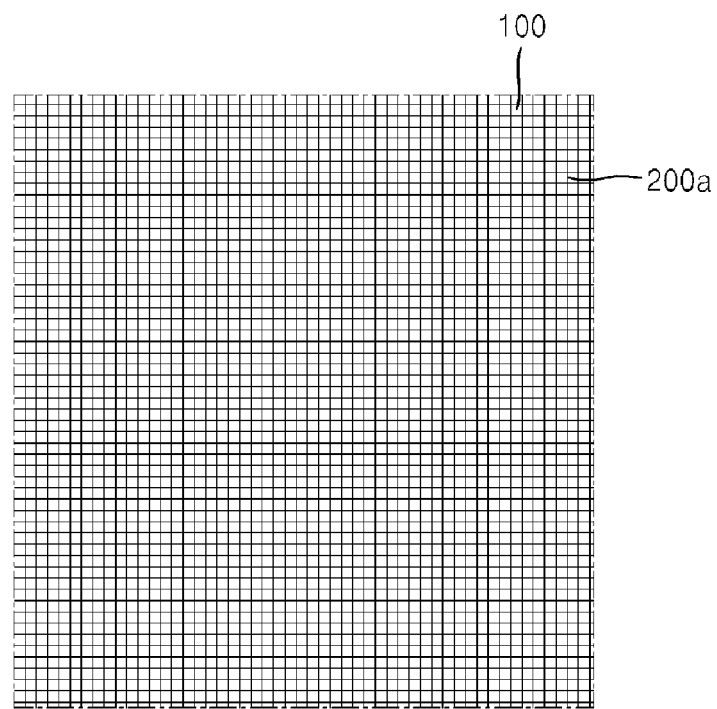
FIGS. 4, 5, 6, 7, and 8 are plan views schematically illustrating a method of manufacturing the touch panel of FIG. 1.

Referring to FIG. 4, the mesh type metal grids 200a are formed on the substrate 100. The metal grids 200a, which are transparent electrodes that replace a transparent conductive oxide, such as ITO, may have low resistance and high transmittance by forming the metal as a mesh type.

The metal grids 200a may include a low resistance metal, such as Ag, Al, or Cu, and may be formed of metal lines including curved surfaces having a linewidth of 10 µm or less. The metal grids 200a may be formed by the electrohydrodynamic jet printing method.

FIGS. 9A and 9B illustrate schematic configurations of a printing apparatus for forming the metal grids 200a by the electrohydrodynamic jet printing method.

The printing apparatus includes a stage 11 on which the substrate 100 having the metal grids 200a to be formed thereon is disposed, and the stage 11 may be translated or tilted by a controller 16. A support unit 12 formed from a conductive material may be disposed on the stage 11, and the substrate 100 may be disposed on the support unit 12.

A jet unit 13 jetting a material (hereinafter referred to as an ink 200a') for forming the metal grid 200a towards the substrate 100 is disposed to face the substrate 100, and may include a nozzle 13a through which an ink 200a' is discharged.

The nozzle 13a may be formed from a conductive material, and a power supply 15 may provide voltages to the support unit 12 and the nozzle 13a.

The jet unit 13 is connected to a pump 14, and the pump 14 may apply pressure to the ink 200a' stored inside the jet unit 13 to force the ink 200a' to be positioned toward an end tip of the nozzle 13a.

After the ink 200a' is positioned at the end tip of the nozzle 13a, an electric field is generated between the support unit 12 and the nozzle 13a when the voltages are applied to the support unit 12 and the nozzle 13a, and the metal grids 200a may be formed while the electric field caused by an electrostatic force causes the ink 200a' to drip.

According to the above described method, a Taylor cone (TC) is formed by the electrostatic force before the ink 200a' is dripped to the substrate 100, and the metal grids 200a are formed with the ink 200' dripped from the TC.

Accordingly, the linewidth w of the metal grids 200a may be less than the diameter d of the nozzle 13a, and the metal grid 200a having a linewidth of about 10 µm or less may be formed from the nozzle 13a having a diameter of several tens of µm.

The metal grids 200a included in the touch panel 10 shown in FIG. 1 may have a linewidth w of about 10 µm or less and, accordingly, light transmittance therethrough may be increased.

The metal grids 200a formed according to the above-described method may be formed of metal lines including curved surfaces. When formed by a photolithography process, the metal grids 200a may include etched surfaces formed by an etching process, and angles may be generated between a top surface and side surfaces of each of the metal lines.

When a thin transparent conductive layer is disposed on the angled metal lines, damages may occur, such as tearing of a portion of the transparent conductive layer corresponding to an angled region caused by an externally applied strain.

The metal grids 200a included in the touch panel 10 shown in FIG. 1 of the present invention include curved surfaces, and the transparent conductive layers 300 shown in FIG. 2 are disposed along the curved surfaces. Accordingly, damage to the transparent conductive layer 300 shown in FIG. 2 as a result of the strain may be limited.

Figure 5:
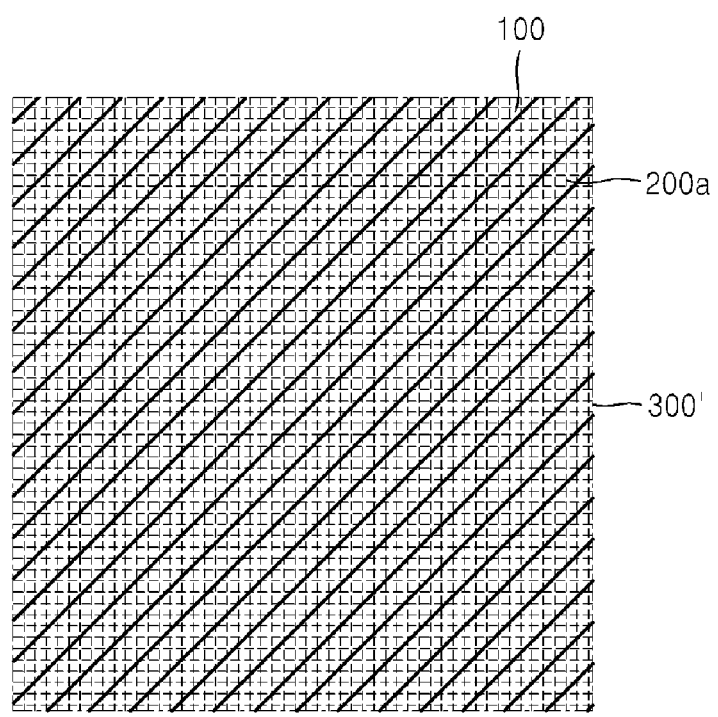

Referring to FIG. 5, a transparent conductive material 300' is formed on the metal grids 200a. The dark, diagonal lines of FIG. 5 are included merely to indicate the presence of the transparent conductive material 300' on the metal grids 200a. The transparent conductive material 300' may include at least one of graphene, metal nanowires, carbon nanotubes, and poly(3,4-ethylenedioxythiophene (PEDOT). The transparent conductive material 300' may be disposed to cover metal lines forming the metal grids 200a and fill vacant spaces between the metal lines.

Figure 6:
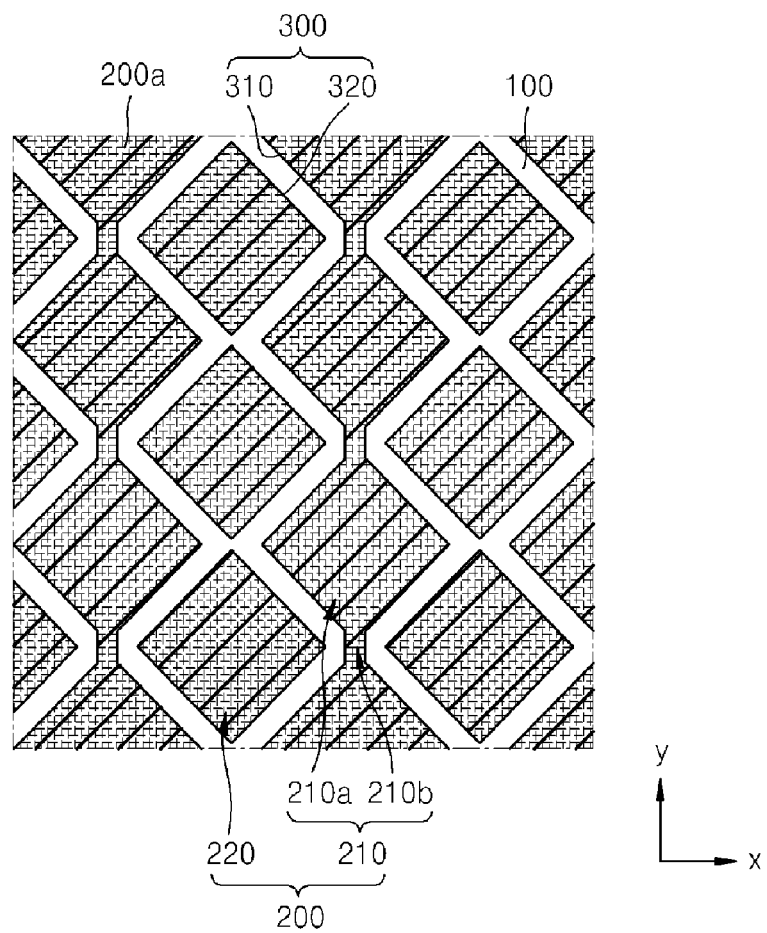

Referring to FIG. 6, the metal grids 200a and the transparent conductive material 300' are simultaneously patterned to form the sense patterns 200 and a transparent conductive layer 300 patterned to correspond to each of the sense patterns 200.

The sense patterns 200 may be extended along the first direction (y axis direction) and include the first sense patterns 210 substantially disposed in parallel with each other and the second sense patterns 220 interposed between the first sense patterns 210. The first sense patterns 210 may include the first sense pattern units 210a and the connection patterns 210b connecting the first sense pattern units 210a to each other.

The transparent conductive layer 300 may include the first transparent conductive layers 310 disposed on the first sense patterns 210 and the second transparent conductive layers 320 disposed on the second sense patterns 220.

Referring to FIG. 7, the insulation layer 400 may be formed on at least a portion of the first transparent conductive layers 310. The insulation layer 400 may be formed on a region corresponding to the connection patterns 210b on the first transparent conductive layers 310.

The insulation layer 400 may be extended to end portions of the second transparent conductive layers 320 from the connection patterns 210b.

Referring to FIG. 8, bridge patterns 500 may be formed on the insulating layer 400, which electrically connect the second transparent conductive layers 320 along the second direction (x axis direction) that intersects with the first direction (y axis direction).

The bridge pattern 500 is wider than the insulating layer 400 in the second direction, and both ends of the bridge patterns 500 may be connected to the second transparent conductive layers 320 disposed on right and left sides of the connection patterns 400.

That is, the second transparent layers 320 may be electrically connected along the second direction (x axis direction) by the bridge patterns 500 and, accordingly, the second sense patterns 220 disposed on the bottom surface of the second transparent conductive layers 320 may be electrically connected along the second direction (x axis direction).

Figure 10A:
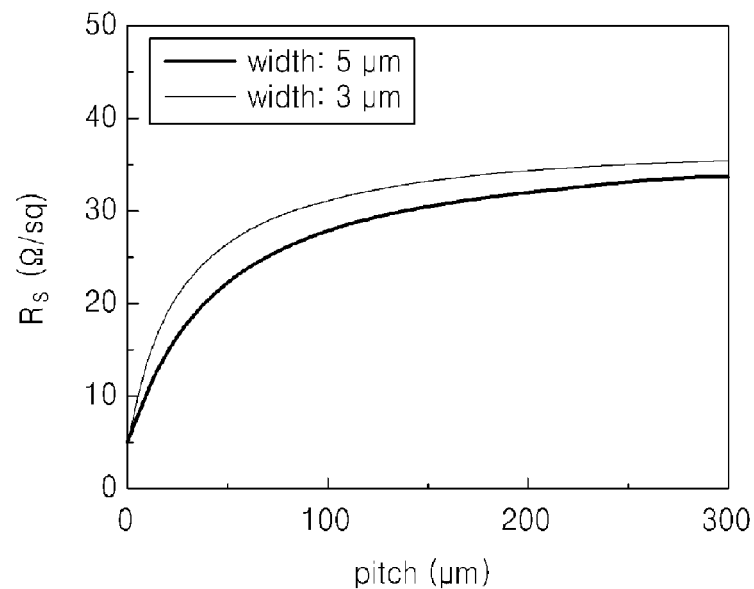
FIG. 10A is a graph representing sheet resistance $R_s$ according to a pitch of the metal grids included in the touch panel of FIG. 1.
Figure 10B:
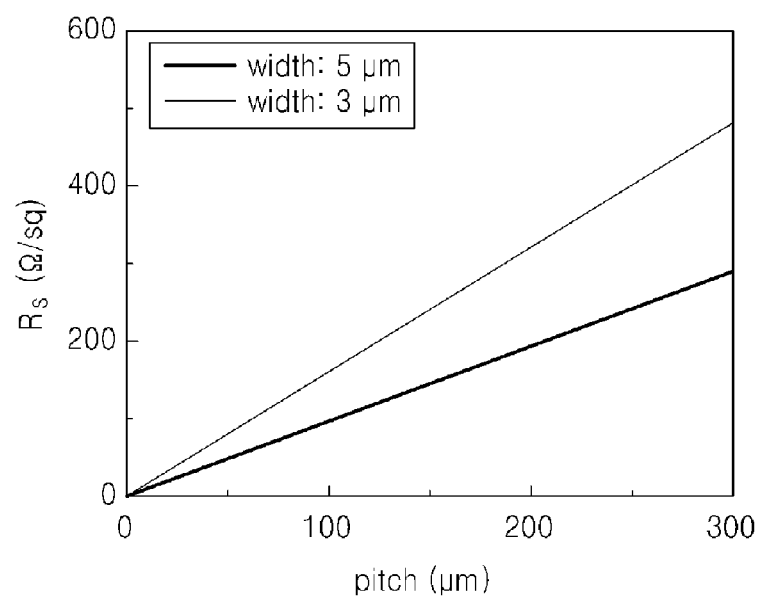
FIG. 10B is a graph representing sheet resistance $R_s$ according to a pitch of metal grids in case where the metal grids does not include a transparent conductive layer.

FIG. 10A is a graph representing sheet resistance $R_s$ according to a pitch of the metal grids included in the touch panel of FIG. 1, and FIG. 10B is a graph representing sheet resistance $R_s$ according to a pitch of the metal grids in case where the transparent conductive layer is not included.

Referring to FIG. 10B, when the transparent conductive layer is not included and in cases where the linewidth w of the metal grids is respectively about 5 μm and 3 μm, it can be confirmed that the sheet resistance $R_s$ linearly increases as the pitch of the metal grids increases. For example, when the pitch is about 200 μm, the sheet resistance $R_s$ may have about a value of about 180 Ω/sq and 310 Ω/sq for linewidths of about 5 μm and 3 μm, respectively.

Referring to FIG. 10A, in cases where the linewidth of the metal grids 200a included in the touch panel 10 of FIG. 1 is about 5 μm and 3 μm, the rate of increase of the sheet resistance $R_s$ of the metal grids decreases as the pitch increases, and an absolute value of the sheet resistance $R_s$ is much smaller than that shown in FIG. 10B. For example, when the pitch is about 200 μm, the sheet resistance $R_s$ may have about a value of about 31 Ω/sq and 34 Ω/sq for linewidths of about 5 μm and 3 μm, respectively.

That is, when the metal grids 200a included in the touch panel 10 of FIG. 1 are covered with the transparent conductive layer 300, the sheet resistance of the metal grids 200a is significantly reduced by the transparent conductive layer 300.

Figure 11:
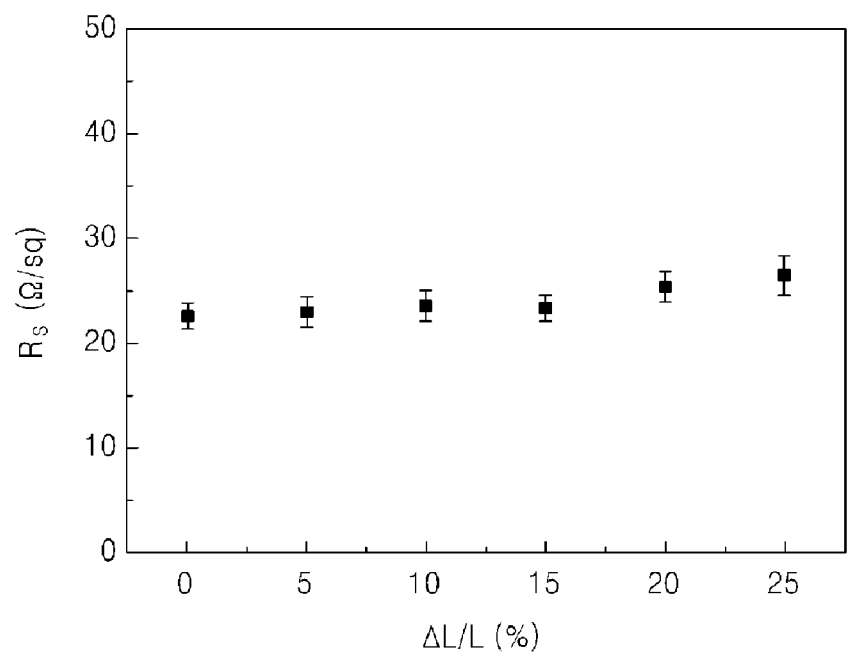
FIG. 11 is a graph representing sheet resistance according to a stretch of the metal grids included in the touch panel of FIG. 1.

FIG. 11 is a graph representing sheet resistance according to a degree of stretch of the metal grids included in the touch panel of FIG. 1.

Referring to FIG. 11, a horizontal axis of the graph denotes a ratio in percent (%) of a stretched length ΔL over an original length L of the metal grids 200a included in the touch panel 10 of FIG. 1, and a vertical axis denotes the sheet resistance $R_s$.

When the metal grids 200a are stretched such that the ratio % of the stretched length ΔL over an original length L becomes 25% in a state where the sheet resistance Rs is about 23 Ω/sq at the original length L, the sheet resistance $R_s$ is increased to 26 Ω/sq. That is, when the metal grids 200a are stretched, the sheet resistance is minimally changed. Accordingly, the touch panel 10 of the present invention is suitable for use in a flexible touch panel.

Figure 12A:
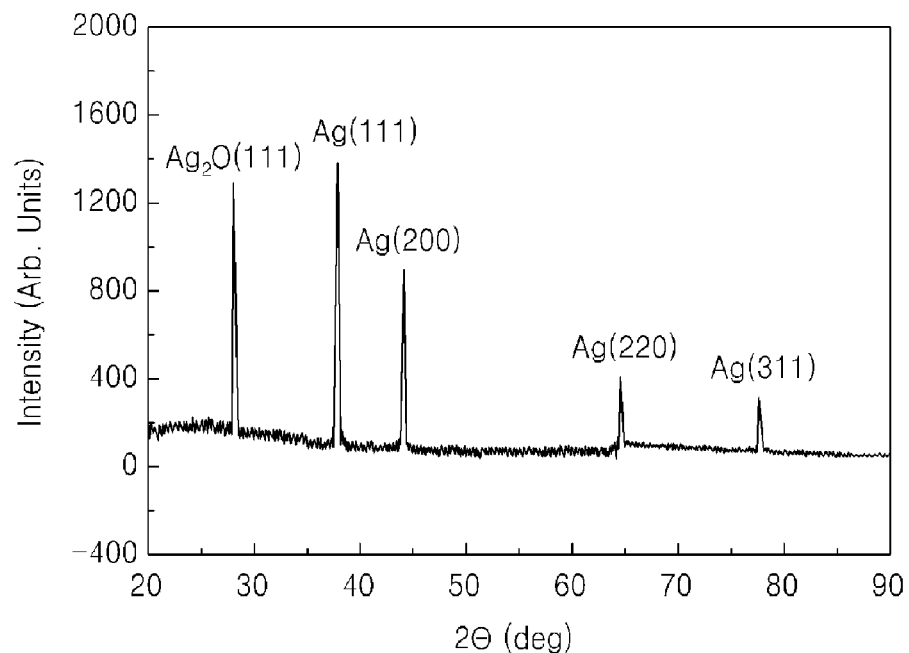
FIG. 12A is a graph representing an X-ray diffraction result for the metal grids included in the touch panel of FIG. 1.
Figure 12B:
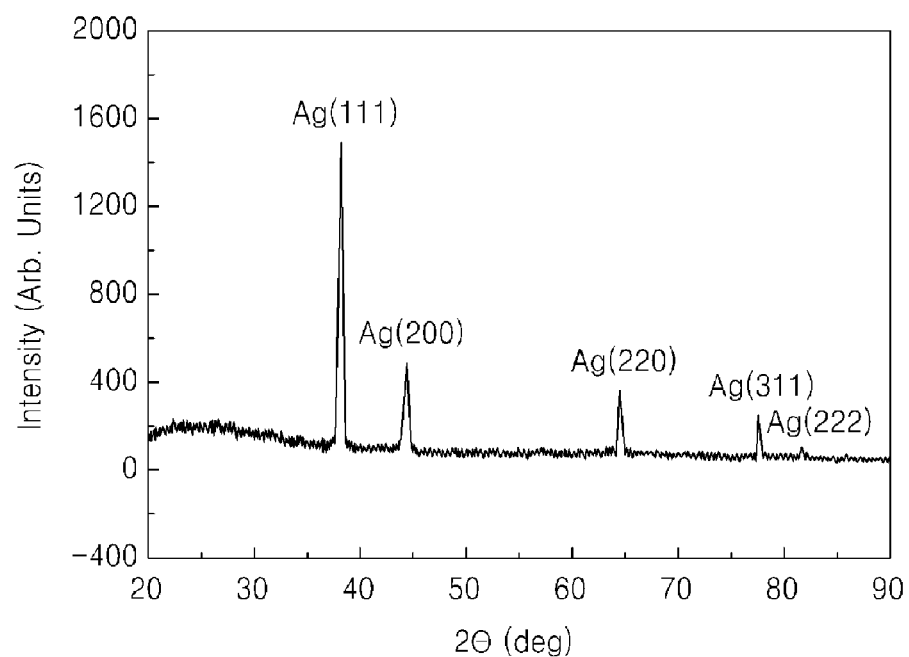
FIG. 12B is a graph representing an X-ray diffraction result in case where the metal grids do not include a transparent conductive layer.

FIG. 12A is a graph representing X-ray diffraction results for the metal grids in the case where the transparent conductive layer is not included, and FIG. 12B is a graph representing X-ray diffraction results for the metal grids included in the touch panel of FIG. 1.

Referring to FIG. 12A, the X-ray diffraction results for the metal grids including silver (Ag) is shown in case where the transparent conductive layer is not included. FIG. 12A shows that silver oxide ($Ag_2O$) exists in the metal grids resulting from reflection of an X-ray incident on the metal grids at an angle (degree) corresponding to the silver oxide. That is, the silver (Ag) forming the metal grids is oxidized.

Referring to FIG. 12B, the X-ray diffraction result for the metal grids 200a included in the touch panel 10 of FIG. 1 is shown. FIG. 12B shows that silver oxide ($Ag_2O$) does not exist in the metal grids 200a as a result of relection of an X-ray incident on the metal grids at an angle (degree) corresponding to the silver oxide.

The metal grids 200a included in the touch panel 10 of exemplary embodiments of the present invention are covered with the transparent conductive layer 300, which includes a material that is more difficult to oxidize than the metal grids 200a so as to function as an oxidation barrier layer for the metal grids 200a.

Figure 13:
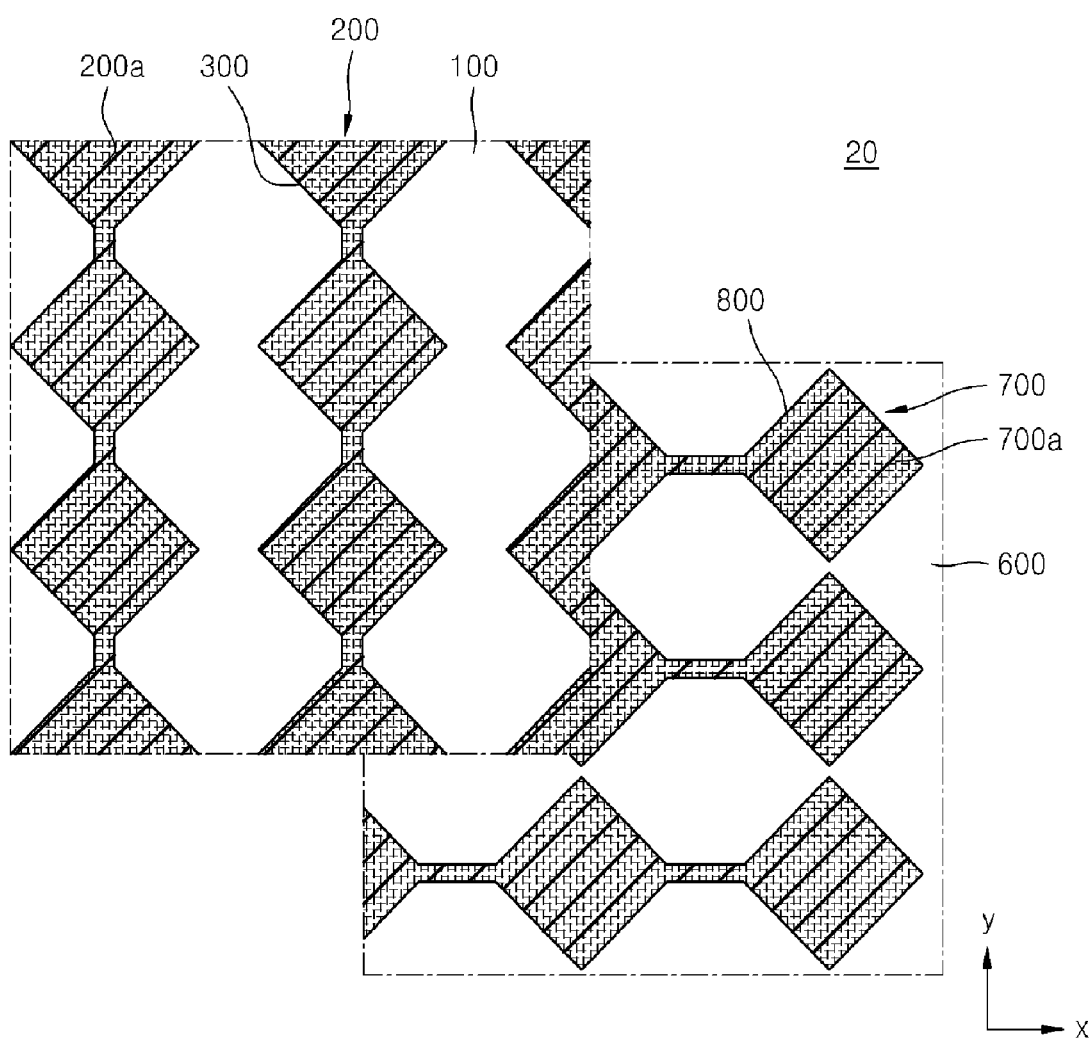
FIG. 13 is a plan view schematically illustrating a touch panel according to an exemplary embodiment of the present invention.

FIG. 13 is a plan view illustrating a touch panel according to an exemplary embodiment of the present invention.

Referring to FIG. 13, the touch panel 20 may include two substrates, namely, a substrate 100 and an additional substrate 600.

Sense patterns 200, including metal grids 200a, and a transparent conductive layer 300 patterned to correspond to each of the sense patterns 200 and disposed to cover the metal grids 200 are disposed on the substrate 100.

The additional substrate 600 is disposed on a surface opposite a surface on which the metal grids 200a of the substrate 100 are disposed. Additional sense patterns 700, including additional metal grids 700a, and an additional transparent conductive layer 800 patterned to correspond to each of the additional sense patterns 700 and disposed to cover the additional metal grids 700a are interposed between the substrate 100 and the additional substrate 600.

The sense patterns 200 may extend along the first direction (y axis direction) and be substantially disposed in parallel with each other, and the additional sense patterns 700 may extend along the second direction (x axis direction) that intersects with the first direction (y axis direction) and be substantially disposed in parallel with each other.

That is, in the touch panel 20 of an exemplary embodiment of the present invention, the sense patterns 200 extending along the first direction (y axis direction) and the second direction (x axis direction) are not all disposed on one substrate 100, as shown in FIG. 1, but sense patterns 200 extending along the first direction (y axis direction) and additional sense patterns 700 extending along the second direction (x axis direction) may be respectively disposed on two different substrates 100 and 600.

When a user's hand or a pen is in contact with the touch panel 20, signals from the sense patterns 200 and 700 corresponding to a contact position may be delivered to a touch driving circuit (not shown) through wirings (not shown), and the touch driving circuit may determine the touch position from x axis position information obtained from the sense patterns 200 and y axis position information obtained from the additional sense patterns 700.

Figure 14:
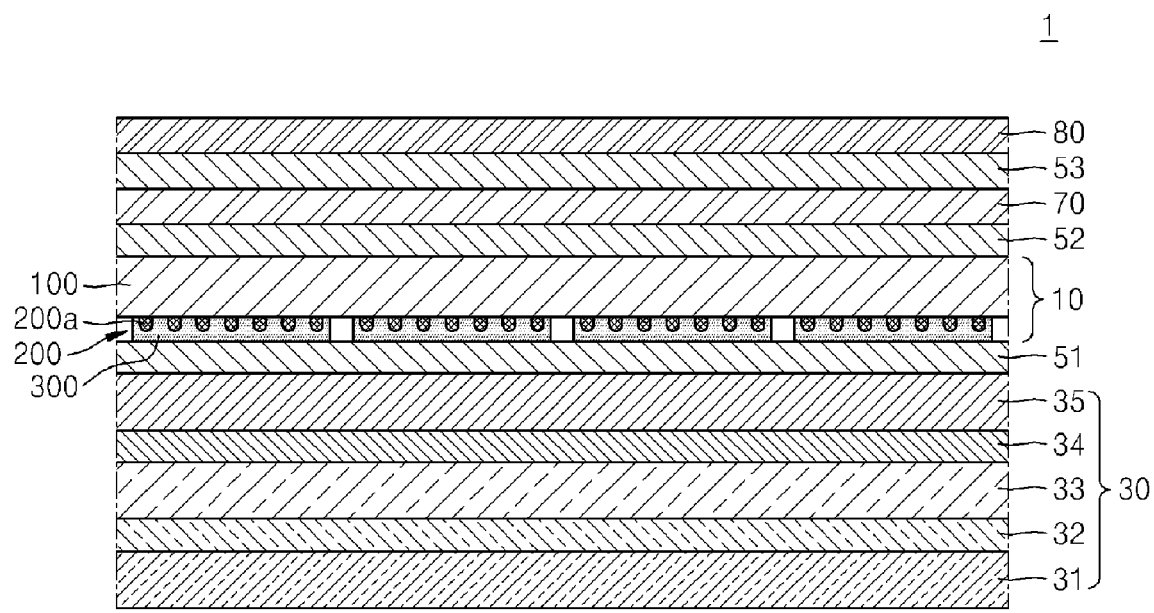
FIG. 14 is a plan view schematically illustrating a display apparatus according to an exemplary embodiment of the present invention.

FIG. 14 is a cross sectional view schematically illustrating a display apparatus according to an exemplary embodiment of the present invention.

Referring to FIG. 14, a display apparatus 1 includes a display panel 30 and a touch panel 10 disposed on a surface from which a light of the display panel 30 is emitted. The touch panel 10 may include a substrate 100, sense patterns 200 disposed on the substrate 100 and including mesh type metal grids 200a, and a transparent conductive layer 300 patterned to correspond to each of the sense patterns 200 and disposed to cover the metal grids 200a.

An adhesion layer 51, including an optical clear adhesive (OCA) or a silicon pressure sensitive adhesive, may be interposed between the display panel 30 and the touch panel 10, and the transparent conductive layer 300, sense patterns 200 and substrate 100 of the touch panel 10 may be sequentially disposed from the adhesion layer 51.

A polarizer 70 and a window 80 may be disposed on the substrate 100 of the touch panel 10, and adhesion layers 52 and 53 may be respectively interposed between the touch panel 10 and the polarizer 70, and between the polarizer 70 and the window 80.

The substrate 100 of the touch panel 10 may include an anisotropic material and function as a phase retarder. For example, the substrate 100 may function as a quarter wave plate and prevent, together with the polarizer 70, an external light incident to the display apparatus 1 from being reflected.

The display panel 30 may include an organic light-emitting device including a pixel electrode 32, an intermediate layer 33 including an organic light-emitting layer, and an opposite electrode 34 disposed on the intermediate layer 33. A substrate 31 supporting the organic light-emitting device is disposed on a bottom portion of the pixel electrode 32, and an encapsulating unit 35 encapsulating the organic light-emitting device may be disposed on the opposite electrode 34.

Although FIG. 14 illustrates an exemplary case where the display panel 30 is an organic light-emitting display panel, the present invention is not limited thereto and the display panel may be a different display panel displaying an image.

Furthermore, although FIG. 14 illustrates an exemplary case of a top emission type organic light-emitting display panel 30 in which a light emitted from the intermediate layer 33 is emitted towards the encapsulating layer 35, the present invention is not limited thereto and the organic light-emitting display panel 30 may be a bottom emission type or a dual emission type. When the organic light-emitting display panel 30 is the bottom emission type, the touch panel may be disposed on a bottom portion of the substrate 31. In case of a dual emission type, the touch panels may be disposed on both the bottom portion of the substrate 31 and the top portion of the encapsulating unit 35.

Moreover, although FIG. 14 exemplifies a case where the touch panel 10 of FIG. 1 is disposed on the display panel 30, the touch panel 20 of FIG. 13 may be disposed on the display panel 30 and, in this case, the substrate 100 shown in FIG. 13 may function as a phase retarder, and the additional substrate 600 may function as a polarizer.

The touch panel 10 or 20 according to the present invention can reduce sheet resistance of the metal grids 200a or 700a included in the touch panel 10 or 20, prevent oxidation thereof, and restrict a resistance increase of the metal grids 200a or 700a, which occurs when the touch panel 10 or 20 is bent or stretched.

In addition, the metal grids 200a or 700a, including metal lines having curved surfaces and having a linewidth of about 10 μm or less, can be formed by an electrohydrodynamic jet printing method.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A touch panel, comprising:
a substrate;
sense patterns disposed on the substrate and comprising mesh type metal grids, the metal grids comprising at least three metal lines in parallel with each other; and
a transparent conductive layer respectively corresponding to each of the sense patterns and disposed to cover the metal grids and completely cover vacant spaces between the at least three metal lines,
wherein each of the at least three metal lines has a curved surface shape in cross-section.

2. The touch panel of claim 1, wherein the transparent conductive layer comprises at least one of graphene, metal nanowires, carbon nanotubes, and Poly(3,4-ethylenedioxythiophene) (PEDOT).

3. The touch panel of claim 1, wherein a linewidth of metal lines is greater than 0 and about 10 μm or less.

4. The touch panel of claim 1, wherein the substrate comprises a flexible transparent substrate and comprises at least one of poly methyl methacrylate (PMMA), polydimethylsiloxane (PDMS), polyethylene terephthalate (PET), a silicon elastomer, polyurethane, and polycarbonate.

5. The touch panel of claim 1, wherein the sense patterns comprise first sense patterns extending substantially in parallel with each other in a first direction, and second sense patterns disposed between the first patterns, and
wherein the transparent conductive layer comprises:
first transparent conductive layers respectively disposed on the first sense patterns; and
second transparent conductive layers respectively disposed on the second sense patterns.

6. The touch panel of claim 5, further comprising:
an insulating layer disposed on at least a portion of the first transparent conductive layers; and
bridge patterns electrically connecting the second transparent conductive layers along a second direction that intersects with the first direction.

7. The touch panel of claim 1, further comprising:
an additional substrate disposed on a surface opposite to a surface of the substrate on which the metal grids are disposed;
additional sense patterns comprising additional metal grids; and
an additional transparent conductive layer patterned to correspond to each of the additional sense patterns and disposed to cover the additional metal grids,
wherein the additional sense patterns and the additional transparent conductive layer are sequentially disposed on the additional substrate between the substrate and the additional substrate.

8. The touch panel of claim 7, wherein:
the sense patterns are extended substantially in parallel with each other along a first direction; and
the additional sense patterns are extended substantially in parallel with each other along a second direction that intersects with the first direction.

9. The touch panel of claim 1, wherein the transparent conductive layer comprises a material which is more difficult to oxidize than the metal grids.

10. A display apparatus comprising:
a display panel; and
a touch panel disposed on a surface from which a light of the display panel is emitted,
wherein the touch panel comprises:
a substrate;
sense patterns disposed on the substrate and comprising mesh type metal grids, the metal grids comprising at least three metal lines in parallel with each other; and
a transparent conductive layer respectively corresponding to each of the sense patterns and disposed to cover the metal grids and completely cover vacant spaces between the at least three metal lines,
wherein each of the at least three metal lines has a curved surface shape in cross-section.

11. The display apparatus of claim 10, further comprising an adhesion layer disposed between the display panel and the touch panel,
wherein the transparent conductive layer, sense patterns, and substrate of the touch panel are sequentially disposed from the adhesion layer.

12. The display apparatus of claim 11, further comprising a polarizer and a window disposed on a surface opposite to a surface of the substrate on which the sense patterns are disposed,
wherein the substrate functions as a phase retarder.

13. The display apparatus of claim 10, wherein a linewidth of the metal lines is greater than 0 and about 10 µm or less.

14. The display apparatus of claim 10, wherein the display panel comprises an organic light-emitting device comprising;
a pixel electrode;
an intermediate layer disposed on the pixel electrode and comprising an organic light-emitting layer; and
an opposite electrode disposed on the intermediate layer.

15. A method of manufacturing a touch panel, comprising:
forming a mesh type metal grid as metal lines on a substrate, the metal grl comprising at least three metal lines in parallel with each other;
forming a transparent conductive layer to cover the metal grid; and
patterning the metal grid and the transparent conductive layer to form sense patterns,
wherein:
the patterned transparent conductive layer corresponds to each of the sense patterns and configured to cover the metal grids and completely cover vacant spaces between the at least three metal lines; and
each of the at least three metal lines has a curved surface shape in cross-section.

16. The method of claim 15, wherein the forming of the metal grid comprises forming the metal grid by an electrohydrodynamic jet printing method.

17. The method of claim 15, wherein the metal lines have line widths greater than 0 and about 10 µm or less.

18. The method of claim 15, wherein the patterning the metal grid and the transparent conductive layer comprises simultaneously patterning the metal grid and the transparent conductive material to form first sense patterns substantially disposed in parallel with each other and extended along a first direction, first transparent conductive layers disposed on the first sense patterns, second sense patterns disposed between the first sense patterns, and second transparent conductive layers disposed on the second sense patterns.

19. The method of claim 18, further comprising:
forming an insulating layer on at least a portion of the first transparent conductive layers; and
forming bridge patterns electrically connecting the second transparent conductive layers on the insulating layer along a second direction that intersects with the first direction.

* * * * *

UNITED STATES PATENT AND TRADEMARK OFFICE
CERTIFICATE OF CORRECTION

PATENT NO. : 10,705,657 B2  
APPLICATION NO. : 14/248126  
DATED : July 7, 2020  
INVENTOR(S) : Choon-Hyop Lee et al.

Page 1 of 1

It is certified that error appears in the above-identified patent and that said Letters Patent is hereby corrected as shown below:

On the Title Page

(73) Assignee, update assignee as:  
Samsung Display Co., Ltd, Yongin-si (KR); UNIST Academy-Industry Research Corporation, Ulsan (KR)

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*